United States Patent
Smith, IV et al.

(10) Patent No.: US 10,276,001 B2
(45) Date of Patent: Apr. 30, 2019

(54) BAND ATTACHMENT MECHANISM WITH HAPTIC RESPONSE

(71) Applicant: Apple Inc., Cupertino, CA (US)

(72) Inventors: Harry W. Smith, IV, San Francisco, CA (US); Patrick Kessler, San Francisco, CA (US); Camille Moussette, Cuptertino, CA (US); John B. Morrell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/102,826

(22) PCT Filed: Dec. 10, 2013

(86) PCT No.: PCT/US2013/074050
§ 371 (c)(1),
(2) Date: Jun. 8, 2016

(87) PCT Pub. No.: WO2015/088491
PCT Pub. Date: Jun. 18, 2015

(65) Prior Publication Data
US 2016/0371942 A1    Dec. 22, 2016

(51) Int. Cl.
*H04B 3/36* (2006.01)
*G08B 6/00* (2006.01)
(Continued)

(52) U.S. Cl.
CPC ............... *G08B 6/00* (2013.01); *G06F 1/163* (2013.01); *G06F 3/016* (2013.01)

(58) Field of Classification Search
CPC ............ G06F 1/163; G08B 6/00; A61B 5/681
(Continued)

(56) References Cited

U.S. PATENT DOCUMENTS 3,001,049 A    9/1961    Didier
3,390,287 A    6/1968    Sonderegger
(Continued)

FOREIGN PATENT DOCUMENTS

AU    2015100710    7/2015
AU    2016100399    5/2016
(Continued)

OTHER PUBLICATIONS

Astronomer's Toolbox, "The Electromagnetic Spectrum," http://imagine.gsfc.nasa.gov/science/toolbox/emspectrum1.html, updated Mar. 2013, 4 pages.
(Continued)

*Primary Examiner* — Phung Nguyen
(74) *Attorney, Agent, or Firm* — Brownstein Hyatt Farber Schreck, LLP

(57) ABSTRACT

A system includes a band, an attachment mechanism attached to the band, and one or more haptic devices included in the attachment mechanism. The attachment mechanism can attach the band to an electronic device. Additionally or alternatively, the attachment mechanism can attach the band to a wearer. The haptic device or devices are in communication with a processing device. At least one of the one or more haptic devices produces a haptic response based on an activation signal received from the processing device.

16 Claims, 6 Drawing Sheets

(51) Int. Cl.
*G06F 1/16* (2006.01)
*G06F 3/01* (2006.01)

(58) Field of Classification Search
USPC .............................. 340/407.1, 683, 4.12, 7.6
See application file for complete search history.

(56) References Cited

U.S. PATENT DOCUMENTS

| | | |
|---|---|---|
| 3,419,739 A | 12/1968 | Clements |
| 4,236,132 A | 11/1980 | Zissimopoulos |
| 4,412,148 A | 10/1983 | Klicker et al. |
| 4,414,984 A | 11/1983 | Zarudiansky |
| 4,695,813 A | 9/1987 | Nobutoki et al. |
| 4,975,616 A | 12/1990 | Park |
| 5,010,772 A | 4/1991 | Bourland |
| 5,245,734 A | 9/1993 | Issartel |
| 5,283,408 A | 2/1994 | Chen |
| 5,293,161 A | 3/1994 | MacDonald et al. |
| 5,317,221 A | 5/1994 | Kubo et al. |
| 5,365,140 A | 11/1994 | Ohya et al. |
| 5,434,549 A | 7/1995 | Hirabayashi et al. |
| 5,436,622 A | 7/1995 | Gutman et al. |
| 5,510,584 A | 4/1996 | Norris |
| 5,510,783 A | 4/1996 | Findlater et al. |
| 5,513,100 A | 4/1996 | Parker et al. |
| 5,587,875 A | 12/1996 | Sellers |
| 5,590,020 A | 12/1996 | Sellers |
| 5,602,715 A | 2/1997 | Lempicki et al. |
| 5,619,005 A | 4/1997 | Shibukawa et al. |
| 5,621,610 A | 4/1997 | Moore et al. |
| 5,625,532 A | 4/1997 | Sellers |
| 5,629,578 A | 5/1997 | Winzer et al. |
| 5,635,928 A | 6/1997 | Takagi et al. |
| 5,718,418 A | 2/1998 | Gugsch |
| 5,739,759 A | 4/1998 | Nakazawa et al. |
| 5,742,242 A | 4/1998 | Sellers |
| 5,783,765 A | 7/1998 | Muramatsu |
| 5,793,605 A | 8/1998 | Sellers |
| 5,812,116 A | 9/1998 | Malhi |
| 5,813,142 A | 9/1998 | Demon |
| 5,818,149 A | 10/1998 | Safari et al. |
| 5,896,076 A | 4/1999 | Van Namen |
| 5,907,199 A | 5/1999 | Miller |
| 5,951,908 A | 9/1999 | Cui et al. |
| 5,959,613 A | 9/1999 | Rosenberg et al. |
| 5,973,441 A | 10/1999 | Lo et al. |
| 5,982,304 A | 11/1999 | Selker et al. |
| 5,982,612 A | 11/1999 | Roylance |
| 5,995,026 A | 11/1999 | Sellers |
| 5,999,084 A | 12/1999 | Armstrong |
| 6,069,433 A | 5/2000 | Lazarus et al. |
| 6,078,308 A | 6/2000 | Rosenberg et al. |
| 6,127,756 A | 10/2000 | Iwaki |
| 6,135,886 A | 10/2000 | Armstrong |
| 6,218,966 B1 | 4/2001 | Goodwin |
| 6,220,550 B1 | 4/2001 | McKillip, Jr. |
| 6,222,525 B1 | 4/2001 | Armstrong |
| 6,252,336 B1 | 6/2001 | Hall |
| 6,342,880 B2 | 1/2002 | Rosenberg et al. |
| 6,351,205 B1 | 2/2002 | Armstrong |
| 6,373,465 B2 | 4/2002 | Jolly et al. |
| 6,408,187 B1 | 6/2002 | Merriam |
| 6,411,276 B1 | 6/2002 | Braun et al. |
| 6,429,849 B1 | 8/2002 | An |
| 6,438,393 B1 | 8/2002 | Surronen |
| 6,444,928 B2 | 9/2002 | Okamoto et al. |
| 6,455,973 B1 | 9/2002 | Ineson |
| 6,465,921 B1 | 10/2002 | Horng |
| 6,552,404 B1 | 4/2003 | Hynes |
| 6,552,471 B1 | 4/2003 | Chandran et al. |
| 6,557,072 B2 | 4/2003 | Osborn |
| 6,642,857 B1 | 11/2003 | Schediwy |
| 6,693,626 B1 | 2/2004 | Rosenberg |
| 6,717,573 B1 | 4/2004 | Shahoian et al. |
| 6,809,462 B2 | 10/2004 | Pelrine et al. |
| 6,809,727 B2 | 10/2004 | Piot et al. |
| 6,864,877 B2 | 3/2005 | Braun et al. |
| 6,906,697 B2 | 6/2005 | Rosenberg |
| 6,906,700 B1 | 6/2005 | Armstrong |
| 6,906,703 B2 | 6/2005 | Vablais et al. |
| 6,952,203 B2 | 10/2005 | Banerjee et al. |
| 6,954,657 B2 | 10/2005 | Bork et al. |
| 6,963,762 B2 | 11/2005 | Kaaresoja et al. |
| 6,995,752 B2 | 2/2006 | Lu |
| 7,005,811 B2 | 2/2006 | Wakuda et al. |
| 7,022,927 B2 | 4/2006 | Hsu |
| 7,023,112 B2 | 4/2006 | Miyamoto et al. |
| 7,081,701 B2 | 7/2006 | Yoon et al. |
| 7,091,948 B2 | 8/2006 | Chang et al. |
| 7,121,147 B2 | 10/2006 | Okada |
| 7,123,948 B2 | 10/2006 | Nielsen |
| 7,130,664 B1 * | 10/2006 | Williams ............ H04M 1/7253 340/384.6 |
| 7,136,045 B2 | 11/2006 | Rosenberg et al. |
| 7,158,122 B2 | 1/2007 | Roberts |
| 7,161,580 B2 | 1/2007 | Bailey et al. |
| 7,162,928 B2 | 1/2007 | Shank et al. |
| 7,170,498 B2 | 1/2007 | Huang |
| 7,176,906 B2 | 2/2007 | Williams et al. |
| 7,180,500 B2 | 2/2007 | Marvit et al. |
| 7,182,691 B1 | 2/2007 | Schena |
| 7,194,645 B2 | 3/2007 | Bieswanger et al. |
| 7,217,891 B2 | 5/2007 | Fischer et al. |
| 7,218,310 B2 | 5/2007 | Tierling et al. |
| 7,219,561 B2 | 5/2007 | Okada |
| 7,253,350 B2 | 8/2007 | Noro et al. |
| 7,269,484 B2 | 9/2007 | Hein |
| 7,333,604 B2 | 2/2008 | Zernovizky et al. |
| 7,334,350 B2 | 2/2008 | Ellis |
| 7,348,968 B2 | 3/2008 | Dawson |
| 7,388,741 B2 | 6/2008 | Konuma et al. |
| 7,392,066 B2 | 6/2008 | Hapamas |
| 7,423,631 B2 | 9/2008 | Shahoian et al. |
| 7,446,752 B2 | 11/2008 | Goldenberg et al. |
| 7,469,155 B2 | 12/2008 | Chu |
| 7,469,595 B2 | 12/2008 | Kessler et al. |
| 7,471,033 B2 | 12/2008 | Thiesen et al. |
| 7,495,358 B2 | 2/2009 | Kobayashi et al. |
| 7,508,382 B2 | 3/2009 | Denoue et al. |
| 7,561,142 B2 | 7/2009 | Shahoian et al. |
| 7,562,468 B2 | 7/2009 | Ellis |
| 7,569,086 B2 | 8/2009 | Chandran |
| 7,586,220 B2 | 9/2009 | Roberts |
| 7,619,498 B2 | 11/2009 | Miura |
| 7,639,232 B2 | 12/2009 | Grant et al. |
| 7,641,618 B2 | 1/2010 | Noda et al. |
| 7,649,305 B2 | 1/2010 | Priya et al. |
| 7,675,253 B2 | 3/2010 | Dorel |
| 7,675,414 B2 | 3/2010 | Ray |
| 7,679,611 B2 | 3/2010 | Schena |
| 7,707,742 B2 | 5/2010 | Ellis |
| 7,710,399 B2 | 5/2010 | Bruneau et al. |
| 7,732,951 B2 | 6/2010 | Mukaide |
| 7,737,828 B2 * | 6/2010 | Yang ................ G06F 3/016 340/4.12 |
| 7,742,036 B2 | 6/2010 | Grant et al. |
| 7,788,032 B2 | 8/2010 | Moloney |
| 7,793,429 B2 | 9/2010 | Ellis |
| 7,793,430 B2 | 9/2010 | Ellis |
| 7,798,982 B2 | 9/2010 | Zets et al. |
| 7,868,489 B2 | 1/2011 | Amemiya et al. |
| 7,886,621 B2 | 2/2011 | Smith et al. |
| 7,886,631 B2 | 2/2011 | Smith et al. |
| 7,888,892 B2 | 2/2011 | McReynolds et al. |
| 7,893,922 B2 | 2/2011 | Klinghult et al. |
| 7,919,945 B2 | 4/2011 | Houston et al. |
| 7,929,382 B2 | 4/2011 | Yamazaki |
| 7,946,483 B2 | 5/2011 | Miller et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,961,909 B2 | 6/2011 | Mandella et al. |
| 8,031,172 B2 | 10/2011 | Kruse et al. |
| 8,044,940 B2 | 10/2011 | Narusawa |

(56) References Cited

U.S. PATENT DOCUMENTS

| | | |
|---|---|---|
| 8,069,881 B1 | 12/2011 | Cunha |
| 8,072,418 B2 | 12/2011 | Crawford et al. |
| 8,077,145 B2 | 12/2011 | Rosenberg et al. |
| 8,081,156 B2 | 12/2011 | Ruettiger |
| 8,082,640 B2 | 12/2011 | Takeda |
| 8,084,968 B2 | 12/2011 | Murray et al. |
| 8,098,234 B2 | 1/2012 | Lacroix et al. |
| 8,123,660 B2 | 2/2012 | Kruse et al. |
| 8,125,453 B2 | 2/2012 | Shahoian et al. |
| 8,141,276 B2 | 3/2012 | Ellis |
| 8,156,809 B2 | 4/2012 | Tierling et al. |
| 8,169,401 B2 | 5/2012 | Hardwick |
| 8,174,344 B2 | 5/2012 | Yakima et al. |
| 8,174,372 B2 | 5/2012 | da Costa |
| 8,179,202 B2 | 5/2012 | Cruz-Hernandez et al. |
| 8,188,623 B2 * | 5/2012 | Park .............. H02K 33/16 310/12.01 |
| 8,205,356 B2 | 6/2012 | Ellis |
| 8,210,942 B2 | 7/2012 | Shimabukuro et al. |
| 8,232,494 B2 | 7/2012 | Purcocks |
| 8,242,641 B2 | 8/2012 | Bae |
| 8,248,277 B2 | 8/2012 | Peterson et al. |
| 8,248,278 B2 | 8/2012 | Schlosser et al. |
| 8,253,686 B2 | 8/2012 | Kyung et al. |
| 8,255,004 B2 | 8/2012 | Huang et al. |
| 8,261,468 B2 | 9/2012 | Ellis |
| 8,264,465 B2 | 9/2012 | Grant et al. |
| 8,270,114 B2 | 9/2012 | Argumedo et al. |
| 8,270,148 B2 | 9/2012 | Griffith et al. |
| 8,288,899 B2 | 10/2012 | Park et al. |
| 8,291,614 B2 | 10/2012 | Ellis |
| 8,294,600 B2 | 10/2012 | Peterson et al. |
| 8,315,746 B2 | 11/2012 | Cox et al. |
| 8,344,834 B2 | 1/2013 | Niiyama |
| 8,378,797 B2 | 2/2013 | Pance et al. |
| 8,378,798 B2 | 2/2013 | Bells et al. |
| 8,378,965 B2 | 2/2013 | Gregorio et al. |
| 8,384,316 B2 | 2/2013 | Houston et al. |
| 8,384,679 B2 | 2/2013 | Paleczny et al. |
| 8,390,594 B2 | 3/2013 | Modarres et al. |
| 8,395,587 B2 | 3/2013 | Cauwels et al. |
| 8,398,570 B2 | 3/2013 | Mortimer et al. |
| 8,411,058 B2 | 4/2013 | Wong et al. |
| 8,446,264 B2 | 5/2013 | Tanase |
| 8,451,255 B2 | 5/2013 | Weber et al. |
| 8,461,951 B2 | 6/2013 | Gassmann et al. |
| 8,466,889 B2 | 6/2013 | Tong et al. |
| 8,471,690 B2 | 6/2013 | Hennig et al. |
| 8,487,759 B2 | 7/2013 | Hill |
| 8,515,398 B2 | 8/2013 | Song et al. |
| 8,542,134 B2 | 9/2013 | Peterson et al. |
| 8,545,322 B2 | 10/2013 | George et al. |
| 8,547,341 B2 | 10/2013 | Takashima et al. |
| 8,547,350 B2 | 10/2013 | Anglin et al. |
| 8,552,859 B2 | 10/2013 | Pakula et al. |
| 8,570,291 B2 | 10/2013 | Motomura |
| 8,575,794 B2 | 11/2013 | Lee et al. |
| 8,587,955 B2 | 11/2013 | DiFonzo et al. |
| 8,596,755 B2 | 12/2013 | Hibi |
| 8,598,893 B2 | 12/2013 | Camus |
| 8,599,047 B2 | 12/2013 | Schlosser et al. |
| 8,599,152 B1 | 12/2013 | Wurtenberger et al. |
| 8,600,354 B2 | 12/2013 | Esaki |
| 8,614,431 B2 | 12/2013 | Huppi et al. |
| 8,621,348 B2 | 12/2013 | Ramsay et al. |
| 8,629,843 B2 | 1/2014 | Steeves et al. |
| 8,633,916 B2 | 1/2014 | Bernstein et al. |
| 8,674,941 B2 | 3/2014 | Casparian et al. |
| 8,680,723 B2 | 3/2014 | Subramanian |
| 8,681,092 B2 | 3/2014 | Harada et al. |
| 8,682,396 B2 | 3/2014 | Yang et al. |
| 8,686,952 B2 | 4/2014 | Pope et al. |
| 8,710,966 B2 | 4/2014 | Hill |
| 8,717,309 B2 | 5/2014 | Almalki |
| 8,723,813 B2 | 5/2014 | Park et al. |
| 8,735,755 B2 | 5/2014 | Peterson et al. |
| 8,760,273 B2 | 6/2014 | Casparian et al. |
| 8,780,060 B2 | 7/2014 | Maschmeyer et al. |
| 8,797,152 B2 | 8/2014 | Henderson et al. |
| 8,798,534 B2 | 8/2014 | Rodriguez et al. |
| 8,803,842 B2 | 8/2014 | Wakasugi et al. |
| 8,836,502 B2 | 9/2014 | Culbert et al. |
| 8,845,071 B2 | 9/2014 | Yamamoto et al. |
| 8,857,248 B2 | 10/2014 | Shih et al. |
| 8,860,562 B2 | 10/2014 | Hill |
| 8,861,776 B2 | 10/2014 | Lastrucci |
| 8,866,600 B2 | 10/2014 | Yang et al. |
| 8,890,668 B2 | 11/2014 | Pance et al. |
| 8,918,215 B2 | 12/2014 | Bosscher et al. |
| 8,928,621 B2 | 1/2015 | Ciesla et al. |
| 8,947,383 B2 | 2/2015 | Ciesla et al. |
| 8,948,821 B2 | 2/2015 | Newham et al. |
| 8,952,937 B2 | 2/2015 | Shih et al. |
| 8,970,534 B2 | 3/2015 | Adachi et al. |
| 8,976,141 B2 | 3/2015 | Myers et al. |
| 9,008,730 B2 | 4/2015 | Kim et al. |
| 9,012,795 B2 | 4/2015 | Niu |
| 9,013,426 B2 | 4/2015 | Cole et al. |
| 9,019,088 B2 | 4/2015 | Zawacki et al. |
| 9,024,738 B2 | 5/2015 | Van Schyndel et al. |
| 9,035,887 B1 | 5/2015 | Prud'hommeaux et al. |
| 9,072,576 B2 | 7/2015 | Nishiura |
| 9,083,821 B2 | 7/2015 | Hughes |
| 9,092,129 B2 | 7/2015 | Abdo et al. |
| 9,098,991 B2 | 8/2015 | Park et al. |
| 9,117,347 B2 | 8/2015 | Matthews |
| 9,122,325 B2 | 9/2015 | Peshkin et al. |
| 9,131,039 B2 | 9/2015 | Behles |
| 9,134,834 B2 | 9/2015 | Reshef |
| 9,141,225 B2 | 9/2015 | Cok et al. |
| 9,158,379 B2 | 10/2015 | Cruz-Hernandez et al. |
| 9,178,509 B2 | 11/2015 | Bernstein |
| 9,189,932 B2 * | 11/2015 | Kerdemelidis .......... G08B 6/00 |
| 9,201,458 B2 | 12/2015 | Hunt et al. |
| 9,202,355 B2 | 12/2015 | Hill |
| 9,235,267 B2 | 1/2016 | Pope et al. |
| 9,274,601 B2 | 3/2016 | Faubert et al. |
| 9,274,602 B2 | 3/2016 | Garg et al. |
| 9,274,603 B2 | 3/2016 | Modarres et al. |
| 9,275,815 B2 | 3/2016 | Hoffmann |
| 9,285,923 B2 | 3/2016 | Liao et al. |
| 9,293,054 B2 | 3/2016 | Bruni et al. |
| 9,300,181 B2 | 3/2016 | Maeda et al. |
| 9,310,906 B2 | 4/2016 | Yumiki et al. |
| 9,310,950 B2 | 4/2016 | Takano et al. |
| 9,317,116 B2 | 4/2016 | Ullrich et al. |
| 9,317,118 B2 | 4/2016 | Puskarich |
| 9,317,154 B2 | 4/2016 | Perlin et al. |
| 9,318,942 B2 | 4/2016 | Sugita et al. |
| 9,325,230 B2 | 4/2016 | Yamada et al. |
| 9,357,052 B2 | 5/2016 | Ullrich |
| 9,360,944 B2 | 6/2016 | Pinault |
| 9,367,238 B2 | 6/2016 | Tanada |
| 9,390,599 B2 | 7/2016 | Weinberg |
| 9,396,434 B2 | 7/2016 | Rothkopf |
| 9,405,369 B2 | 8/2016 | Modarres et al. |
| 9,411,423 B2 | 8/2016 | Heubel |
| 9,417,695 B2 | 8/2016 | Griffin et al. |
| 9,449,476 B2 | 9/2016 | Lynn |
| 9,477,342 B2 | 10/2016 | Daverman et al. |
| 9,501,912 B1 | 11/2016 | Hayskjold et al. |
| 9,542,028 B2 | 1/2017 | Filiz et al. |
| 9,544,694 B2 | 1/2017 | Abe et al. |
| 9,622,214 B2 | 4/2017 | Ryu |
| 9,659,482 B2 | 5/2017 | Yang et al. |
| 9,594,450 B2 | 7/2017 | Lynn et al. |
| 9,727,157 B2 | 8/2017 | Ham et al. |
| 9,778,743 B2 | 10/2017 | Grant et al. |
| 9,779,592 B1 | 10/2017 | Hoen |
| 9,823,833 B2 | 11/2017 | Grant et al. |
| 9,904,393 B2 | 2/2018 | Frey et al. |
| 9,934,661 B2 | 4/2018 | Hill |
| 9,990,099 B2 | 6/2018 | Ham et al. |
| 10,067,585 B2 | 9/2018 | Kim |

(56) References Cited

U.S. PATENT DOCUMENTS

| | | |
|---|---|---|
| 10,139,959 B2 | 11/2018 | Butler et al. |
| 2002/0115478 A1* | 8/2002 | Fujisawa ............. H04M 1/6505 455/567 |
| 2002/0194284 A1 | 12/2002 | Haynes |
| 2003/0210259 A1 | 11/2003 | Liu |
| 2004/0021663 A1 | 2/2004 | Suzuki et al. |
| 2004/0127198 A1 | 7/2004 | Roskind et al. |
| 2005/0057528 A1 | 3/2005 | Kleen |
| 2005/0107129 A1 | 5/2005 | Kaewell et al. |
| 2005/0110778 A1 | 5/2005 | Ben Ayed |
| 2005/0118922 A1 | 6/2005 | Endo |
| 2005/0217142 A1 | 10/2005 | Ellis |
| 2005/0237306 A1 | 10/2005 | Klein et al. |
| 2005/0248549 A1 | 11/2005 | Dietz et al. |
| 2005/0258715 A1 | 11/2005 | Schlabach |
| 2006/0014569 A1 | 1/2006 | Delgiorno |
| 2006/0154674 A1 | 7/2006 | Landschaft et al. |
| 2006/0209037 A1 | 9/2006 | Wang et al. |
| 2006/0239746 A1 | 10/2006 | Grant |
| 2006/0252463 A1 | 11/2006 | Liao |
| 2007/0099574 A1 | 5/2007 | Wang |
| 2007/0152974 A1 | 7/2007 | Kim et al. |
| 2007/0168430 A1 | 7/2007 | Brun et al. |
| 2007/0178942 A1 | 8/2007 | Sadler et al. |
| 2007/0188450 A1 | 8/2007 | Hernandez et al. |
| 2008/0084384 A1 | 4/2008 | Gregorio et al. |
| 2008/0106980 A1* | 5/2008 | Guillaume ......... G04B 37/1486 368/282 |
| 2008/0158149 A1 | 7/2008 | Levin |
| 2008/0165148 A1 | 7/2008 | Williamson |
| 2008/0181501 A1 | 7/2008 | Faraboschi |
| 2008/0181706 A1 | 7/2008 | Jackson |
| 2008/0192014 A1 | 8/2008 | Kent et al. |
| 2008/0204428 A1 | 8/2008 | Pierce et al. |
| 2008/0255794 A1 | 10/2008 | Levine |
| 2009/0002328 A1 | 1/2009 | Ullrich et al. |
| 2009/0115734 A1 | 5/2009 | Fredriksson et al. |
| 2009/0120105 A1 | 5/2009 | Ramsay et al. |
| 2009/0128503 A1 | 5/2009 | Grant et al. |
| 2009/0135142 A1 | 5/2009 | Fu et al. |
| 2009/0167702 A1 | 7/2009 | Nurmi |
| 2009/0167704 A1 | 7/2009 | Terlizzi et al. |
| 2009/0218148 A1 | 9/2009 | Hugeback et al. |
| 2009/0225046 A1 | 9/2009 | Kim et al. |
| 2009/0236210 A1 | 9/2009 | Clark et al. |
| 2009/0267892 A1 | 10/2009 | Faubert |
| 2009/0313542 A1 | 12/2009 | Cruz-Hernandez et al. |
| 2010/0020036 A1 | 1/2010 | Hui et al. |
| 2010/0053087 A1 | 3/2010 | Dai et al. |
| 2010/0079264 A1 | 4/2010 | Hoellwarth |
| 2010/0089735 A1 | 4/2010 | Takeda et al. |
| 2010/0141408 A1 | 6/2010 | Doy et al. |
| 2010/0141606 A1 | 6/2010 | Bae et al. |
| 2010/0148944 A1 | 6/2010 | Kim et al. |
| 2010/0152620 A1 | 6/2010 | Ramsay et al. |
| 2010/0164894 A1 | 7/2010 | Kim et al. |
| 2010/0188422 A1 | 7/2010 | Shingai et al. |
| 2010/0194547 A1 | 8/2010 | Terrell et al. |
| 2010/0231508 A1 | 9/2010 | Cruz-Hernandez et al. |
| 2010/0231550 A1 | 9/2010 | Cruz-Hernandez et al. |
| 2010/0265197 A1 | 10/2010 | Purdy |
| 2010/0309141 A1 | 12/2010 | Cruz-Hernandez et al. |
| 2010/0328229 A1 | 12/2010 | Weber et al. |
| 2011/0007023 A1 | 1/2011 | Abrahamsson et al. |
| 2011/0053577 A1 | 3/2011 | Lee et al. |
| 2011/0107958 A1 | 5/2011 | Pance et al. |
| 2011/0121765 A1 | 5/2011 | Anderson et al. |
| 2011/0128239 A1 | 6/2011 | Polyakov et al. |
| 2011/0148608 A1 | 6/2011 | Grant et al. |
| 2011/0157052 A1 | 6/2011 | Lee et al. |
| 2011/0163985 A1 | 7/2011 | Bae et al. |
| 2011/0193824 A1 | 8/2011 | Modarres et al. |
| 2011/0248948 A1 | 10/2011 | Griffin et al. |
| 2011/0260988 A1 | 10/2011 | Colgate et al. |
| 2011/0263200 A1* | 10/2011 | Thornton ................ H04M 1/04 455/41.2 |
| 2011/0291950 A1 | 12/2011 | Tong |
| 2011/0304559 A1 | 12/2011 | Pasquero |
| 2012/0068957 A1 | 3/2012 | Puskarich et al. |
| 2012/0075198 A1 | 3/2012 | Sulem et al. |
| 2012/0092263 A1 | 4/2012 | Peterson et al. |
| 2012/0126959 A1 | 5/2012 | Zarrabi et al. |
| 2012/0127088 A1 | 5/2012 | Pance et al. |
| 2012/0133494 A1 | 5/2012 | Cruz-Hernandez et al. |
| 2012/0139844 A1 | 6/2012 | Ramstein et al. |
| 2012/0194976 A1 | 8/2012 | Golko et al. |
| 2012/0206248 A1 | 8/2012 | Biggs |
| 2012/0256848 A1 | 10/2012 | Madabusi Srinivasan |
| 2012/0268412 A1 | 10/2012 | Cruz-Hernandez et al. |
| 2012/0274578 A1 | 11/2012 | Snow et al. |
| 2012/0280927 A1 | 11/2012 | Ludwig |
| 2012/0319987 A1 | 12/2012 | Woo |
| 2012/0327006 A1 | 12/2012 | Israr et al. |
| 2013/0027345 A1 | 1/2013 | Binzel |
| 2013/0033967 A1 | 2/2013 | Chuang et al. |
| 2013/0058816 A1 | 3/2013 | Kim |
| 2013/0063285 A1 | 3/2013 | Elias |
| 2013/0063356 A1 | 3/2013 | Martisauskas |
| 2013/0106699 A1 | 5/2013 | Babatunde |
| 2013/0141365 A1 | 6/2013 | Lynn et al. |
| 2013/0191741 A1 | 7/2013 | Dickinson et al. |
| 2013/0200732 A1 | 8/2013 | Jun et al. |
| 2013/0207793 A1 | 8/2013 | Weaber et al. |
| 2013/0217491 A1 | 8/2013 | Hilbert et al. |
| 2013/0222280 A1 | 8/2013 | Sheynblat et al. |
| 2013/0228023 A1 | 9/2013 | Drasnin et al. |
| 2013/0261811 A1 | 10/2013 | Yagi et al. |
| 2013/0300590 A1 | 11/2013 | Dietz et al. |
| 2014/0035397 A1 | 2/2014 | Endo et al. |
| 2014/0082490 A1 | 3/2014 | Jung et al. |
| 2014/0085065 A1 | 3/2014 | Biggs et al. |
| 2014/0143785 A1* | 5/2014 | Mistry ..................... G06F 1/163 718/104 |
| 2014/0168153 A1 | 6/2014 | Deichmann et al. |
| 2014/0197936 A1 | 7/2014 | Biggs et al. |
| 2014/0232534 A1 | 8/2014 | Birnbaum et al. |
| 2014/0247227 A1 | 9/2014 | Jiang et al. |
| 2014/0267076 A1 | 9/2014 | Birnbaum et al. |
| 2014/0267952 A1 | 9/2014 | Sirois |
| 2015/0005039 A1 | 1/2015 | Liu et al. |
| 2015/0040005 A1* | 2/2015 | Faaborg ............... H04M 19/047 715/702 |
| 2015/0090572 A1 | 4/2015 | Lee et al. |
| 2015/0098309 A1 | 4/2015 | Adams et al. |
| 2015/0169059 A1 | 6/2015 | Behles et al. |
| 2015/0192414 A1 | 7/2015 | Das et al. |
| 2015/0194165 A1 | 7/2015 | Faaborg et al. |
| 2015/0220199 A1 | 8/2015 | Wang et al. |
| 2015/0227204 A1 | 8/2015 | Gipson et al. |
| 2015/0296480 A1 | 10/2015 | Kinsey et al. |
| 2015/0324049 A1 | 11/2015 | Kies et al. |
| 2015/0349619 A1 | 12/2015 | Degner et al. |
| 2016/0049265 A1 | 2/2016 | Bernstein |
| 2016/0063826 A1 | 3/2016 | Morrell et al. |
| 2016/0071384 A1 | 3/2016 | Hill |
| 2016/0103544 A1 | 4/2016 | Filiz et al. |
| 2016/0162025 A1 | 6/2016 | Shah |
| 2016/0163165 A1 | 6/2016 | Morrell et al. |
| 2016/0172953 A1 | 6/2016 | Hamel et al. |
| 2016/0195929 A1 | 7/2016 | Martinez et al. |
| 2016/0196935 A1 | 7/2016 | Bernstein |
| 2016/0206921 A1 | 7/2016 | Szabados et al. |
| 2016/0211736 A1 | 7/2016 | Moussette et al. |
| 2016/0216764 A1 | 7/2016 | Morrell et al. |
| 2016/0216766 A1 | 7/2016 | Puskarich |
| 2016/0231815 A1 | 8/2016 | Moussette et al. |
| 2016/0233012 A1 | 8/2016 | Lubinski et al. |
| 2016/0241119 A1 | 8/2016 | Keeler |
| 2016/0259480 A1 | 9/2016 | Augenbergs et al. |
| 2016/0306423 A1 | 10/2016 | Uttermann et al. |
| 2017/0038905 A1 | 2/2017 | Bijamov et al. |
| 2017/0070131 A1 | 3/2017 | Degner et al. |
| 2017/0084138 A1 | 3/2017 | Hajati et al. |

(56) References Cited

U.S. PATENT DOCUMENTS

| | | |
|---|---|---|
| 2017/0085163 A1 | 3/2017 | Hajati et al. |
| 2017/0090667 A1 | 3/2017 | Abdollahian et al. |
| 2017/0192507 A1 | 7/2017 | Lee et al. |
| 2017/0192508 A1 | 7/2017 | Lim et al. |
| 2017/0242541 A1 | 8/2017 | Luchi et al. |
| 2017/0255295 A1 | 9/2017 | Tanemura et al. |
| 2017/0257844 A1 | 9/2017 | Miller et al. |
| 2017/0285747 A1 | 10/2017 | Chen |
| 2017/0311282 A1 | 10/2017 | Miller et al. |
| 2017/0357325 A1 | 12/2017 | Yang et al. |
| 2017/0364158 A1 | 12/2017 | Wen et al. |
| 2018/0052550 A1 | 2/2018 | Zhang et al. |
| 2018/0060941 A1 | 3/2018 | Yang et al. |
| 2018/0075715 A1 | 3/2018 | Morrell et al. |
| 2018/0081441 A1 | 3/2018 | Pedder et al. |
| 2018/0174409 A1 | 6/2018 | Hill |
| 2018/0203513 A1 | 7/2018 | Rihn |

FOREIGN PATENT DOCUMENTS

| | | |
|---|---|---|
| CA | 2355434 | 2/2002 |
| CN | 1324030 | 11/2001 |
| CN | 1817321 | 8/2006 |
| CN | 101120290 | 2/2008 |
| CN | 101409164 | 4/2009 |
| CN | 101763192 | 6/2010 |
| CN | 101903848 | 12/2010 |
| CN | 101938207 | 1/2011 |
| CN | 102025257 | 4/2011 |
| CN | 201829004 | 5/2011 |
| CN | 102163076 | 8/2011 |
| CN | 102246122 | 11/2011 |
| CN | 102315747 | 1/2012 |
| CN | 102591512 | 7/2012 |
| CN | 102667681 | 9/2012 |
| CN | 102713805 | 10/2012 |
| CN | 102768593 | 11/2012 |
| CN | 102844972 | 12/2012 |
| CN | 102915111 | 2/2013 |
| CN | 103019569 | 4/2013 |
| CN | 103154867 | 6/2013 |
| CN | 103181090 | 6/2013 |
| CN | 103218104 | 7/2013 |
| CN | 103278173 | 9/2013 |
| CN | 103416043 | 11/2013 |
| CN | 103440076 | 12/2013 |
| CN | 103970339 | 8/2014 |
| CN | 104220963 | 12/2014 |
| CN | 104956244 | 9/2015 |
| CN | 105556268 | 5/2016 |
| DE | 19517630 | 11/1996 |
| DE | 10330024 | 1/2005 |
| DE | 102009038103 | 2/2011 |
| DE | 102011115762 | 4/2013 |
| EP | 0483955 | 5/1992 |
| EP | 1047258 | 10/2000 |
| EP | 1686776 | 8/2006 |
| EP | 2060967 | 5/2009 |
| EP | 2073099 | 6/2009 |
| EP | 2194444 | 6/2010 |
| EP | 2264562 A2 | 12/2010 |
| EP | 2315186 | 4/2011 |
| EP | 2374430 | 10/2011 |
| EP | 2395414 | 12/2011 |
| EP | 2461228 | 6/2012 |
| EP | 2631746 | 8/2013 |
| EP | 2434555 | 10/2013 |
| JP | H05301342 A2 | 11/1993 |
| JP | 2002199689 | 7/2002 |
| JP | 2002102799 | 9/2002 |
| JP | 200362525 | 3/2003 |
| JP | 2003527046 | 9/2003 |
| JP | 200494389 | 3/2004 |
| JP | 2004236202 | 8/2004 |
| JP | 2006150865 | 6/2006 |
| JP | 2007519099 | 7/2007 |
| JP | 2010272903 | 12/2010 |
| JP | 2012135755 | 7/2012 |
| JP | 2014002729 | 1/2014 |
| JP | 2014509028 | 4/2014 |
| JP | 2014235133 | 12/2014 |
| JP | 2016095552 | 5/2016 |
| KR | 20050033909 | 4/2005 |
| KR | 1020100046602 | 5/2010 |
| KR | 1020110101516 | 9/2011 |
| KR | 20130024420 | 3/2013 |
| TW | 200518000 | 11/2007 |
| TW | 200951944 | 12/2009 |
| TW | 201145336 | 12/2011 |
| TW | 201218039 | 5/2012 |
| TW | 201425180 | 7/2014 |
| WO | WO 97/16932 | 5/1997 |
| WO | WO 00/051190 | 8/2000 |
| WO | WO 01/059588 | 8/2001 |
| WO | WO 01/089003 | 11/2001 |
| WO | WO 02/073587 | 9/2002 |
| WO | WO 03/038800 | 5/2003 |
| WO | WO 06/057770 | 6/2006 |
| WO | WO 07/114631 | 10/2007 |
| WO | WO 08/075082 | 6/2008 |
| WO | WO 09/038862 | 3/2009 |
| WO | WO 09/068986 | 6/2009 |
| WO | WO 09/097866 | 8/2009 |
| WO | WO 09/122331 | 10/2009 |
| WO | WO 09/150287 | 12/2009 |
| WO | WO 10/085575 | 7/2010 |
| WO | WO 10/087925 | 8/2010 |
| WO | WO 11/007263 | 1/2011 |
| WO | WO 12/052635 | 4/2012 |
| WO | WO 12/129247 | 9/2012 |
| WO | WO 13/069148 | 5/2013 |
| WO | WO 13/150667 | 10/2013 |
| WO | WO 13/169302 | 11/2013 |
| WO | WO 13/173838 | 11/2013 |
| WO | WO 13/186846 | 12/2013 |
| WO | WO 13/186847 | 12/2013 |
| WO | WO 14/018086 | 1/2014 |
| WO | WO 14/098077 | 6/2014 |
| WO | WO 13/169299 | 11/2014 |
| WO | WO 15/023670 | 2/2015 |

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Stanford University, Third Joint Eurohaptics Conference and Symposium on Haptic Interfaces for Virtual Environment and Teleoperator Systems, Salt Lake City, Utah, Mar. 18-20, 2009, pp. 440-445.

Kim et al., "Tactile Rendering of 3D Features on Touch Surfaces," UIST '13, Oct. 8-11, 2013, St. Andrews, United Kingdom, 8 pages.

Lee et al, "Haptic Pen: Tactile Feedback Stylus for Touch Screens," Mitsubishi Electric Research Laboratories, http://wwwlmerl.com, 6 pages, Oct. 2004.

U.S. Appl. No. 15/251,459, filed Aug. 30, 2016, Miller et al.
U.S. Appl. No. 15/260,047, filed Sep. 8, 2016, Degner.
U.S. Appl. No. 15/306,034, filed Oct. 21, 2016, Bijamov et al.
U.S. Appl. No. 15/364,822, filed Nov. 30, 2016, Chen.

International Search Report and Written Opinion dated Jun. 25, 2014, PCT/US2013/074050, 9 pages.

U.S. Appl. No. 15/621,966, filed Jun. 13, 2017, Pedder et al.
U.S. Appl. No. 15/621,930, filed Jun. 13, 2017, Wen et al.
U.S. Appl. No. 15/622,017, filed Jun. 13, 2017, Yang et al.
U.S. Appl. No. 15/800,630, filed Nov. 1, 2017, Morrell et al.

Nakamura, "A Torso Haptic Display Based on Shape Memory Alloy Actuators," Massachusetts Institute of Technology, 2003, pp. 1-123.

(56) References Cited

OTHER PUBLICATIONS

Actuator definition downloaded from http://www.thefreedictionary.com/actuator on May 3, 2018, 2 pages.

* cited by examiner

BAND ATTACHMENT MECHANISM WITH HAPTIC RESPONSE

CROSS REFERENCE TO RELATED APPLICATION

This application is a 35 U.S.C. § 371 application of PCT/US2013/074050, filed on Dec. 10, 2013, and entitled "Band Attachment Mechanism with Haptic Response," which is incorporated by reference as if fully disclosed herein.

TECHNICAL FIELD

The present invention relates generally to electronic devices, and more particularly to an electronic device in communication with a band. Still more particularly, the present invention relates to a band attachment that provides a haptic response to a wearer.

BACKGROUND

Haptic feedback can be used to provide information to a user through the user's sense of touch. For example, contemporary cellular telephones and other similar electronic devices may use vibrations to denote various events, such as when a touchscreen or home button is pressed. Other electronic devices, such as joysticks used in gaming systems, can vibrate or produce a force as feedback when a user interacts with onscreen actions in a video game.

But many portable electronic devices continue to decrease in size while the number of uses and functions of the electronic devices can remain the same or increase. For example, some cellular phones and digital music players are contained within small and compact housings that include electronic circuits and components that provide a user with a wide range of applications and functions. Space can therefore be an issue when including or adding additional components, circuits, and functions to a portable electronic device.

SUMMARY

In one aspect, an attachment mechanism can attach a band to an electronic device. The attachment mechanism includes one or more haptic devices disposed in a housing of the attachment mechanism and adapted to move in at least one direction with respect to the band or to the electronic device.

In another aspect, an attachment mechanism is attached to a band. The band can be configured to encircle a body part of a user or wearer. The attachment mechanism includes one or more haptic devices adapted to move in at least one direction with respect to the band.

In yet another aspect, a system includes a band, an attachment mechanism attached to the band, and one or more haptic devices disposed in the attachment mechanism. The attachment mechanism can attach the band to an electronic device. Additionally or alternatively, the attachment mechanism can attach the band to a wearer. The haptic device or devices are in communication with a processing device. At least one of the one or more haptic devices can produce a haptic response based on an activation signal received from the processing device. The processing device can be included in an electronic device that is attached to the band with the attachment mechanism. Additionally or alternatively, the processing device can be external to the electronic device attached to the band. The external processing device can be in communication with the one or more haptic devices in the attachment mechanism.

In another aspect, a method for providing a haptic output from an electronic device can include receiving an indication that a haptic output is to be generated, and in response, actuating a haptic element coupled to a flexible portion of the electronic device. The flexible portion can be configured to encircle a body part of a user or wearer. The flexible portion is moved through actuation of the haptic element.

DETAILED DESCRIPTION

Figure 1:
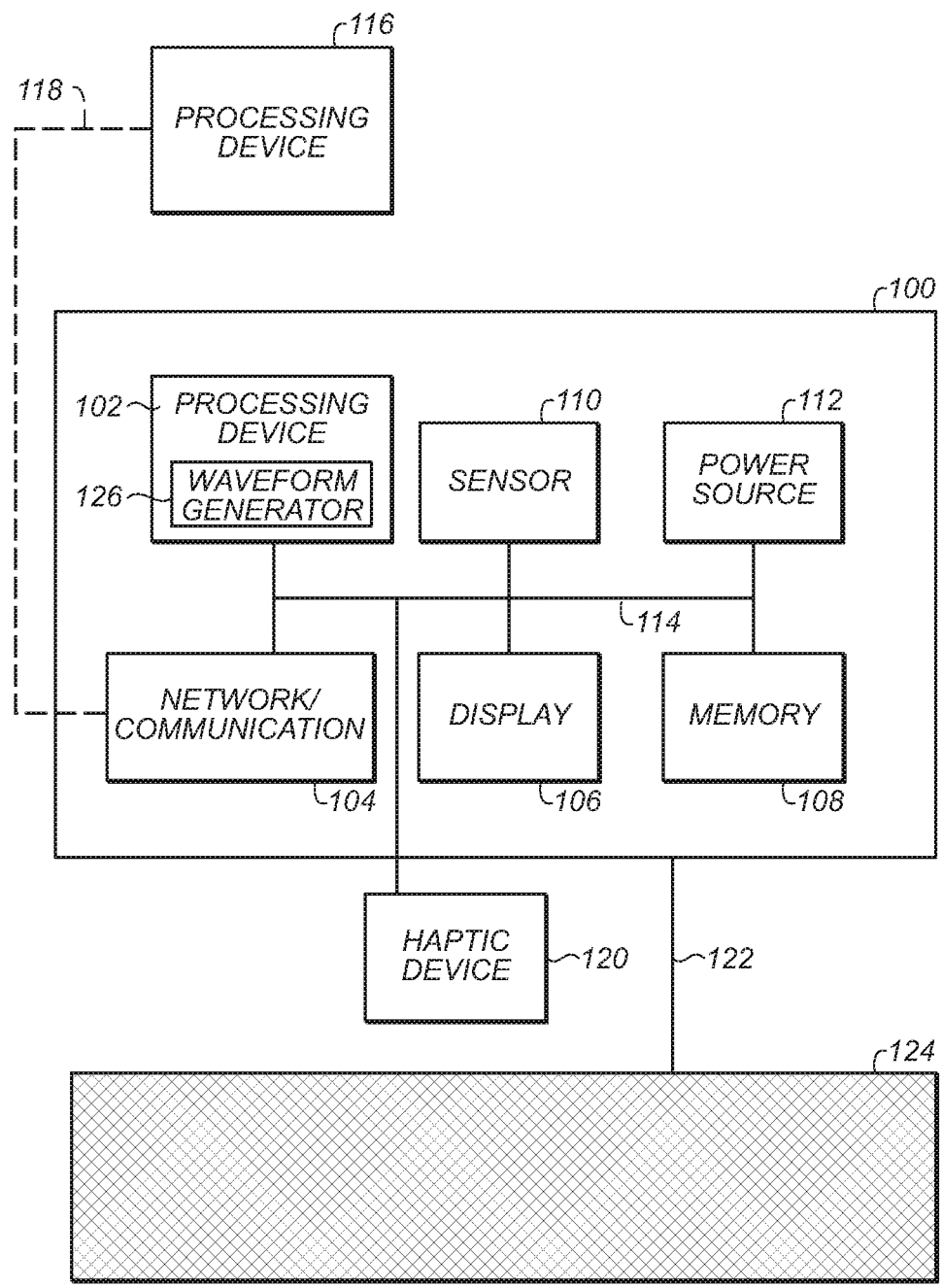
FIG. 1 is an illustrative block diagram of an electronic device that can be in communication with one or more haptic devices in an attachment mechanism of a band.

Embodiments described herein can provide a user with a haptic alert or response with one or more attachment mechanisms for a wearable band. The band can be configured to encircle a body part of a user. As one example, the wearable band can include an electronic device attached to a wrist band. The haptic response can involve one or more attachment mechanisms that attach the wrist band to the electronic device moving with respect to the electronic device. Additionally or alternatively, one or more attachment mechanisms that attach the wrist band to the wearer can move with respect to the electronic device. By way of example only, an attachment mechanism can move laterally or side-to-side with respect to the electronic device, move towards and away from the electronic device, move up and down with respect to the electronic device, and/or rotate with respect to the electronic device. As still another example, the electronic device may be integrated into, or part of, the band and/or band structure.

The electronic device can be in communication with the one or more haptic devices through a wired and/or wireless connection. In some embodiments, a remote electronic device can be in communication with the electronic device attached to the wearable band and the remote electronic device can activate or deactivate a haptic response in one or more attachment mechanisms associated with the wearable band.

A processing device can be included in the electronic device that transmits activation signals to one or more haptic devices. Each haptic device can produce a selected force (e.g., pressure), motion, and/or vibratory response in an attachment mechanism that provides a tactile stimulation to the skin of the person wearing the band. An activation signal can be sent at select times to a single haptic device or to groups of two or more haptic devices. Haptic stimulation can act as notifications for one or more events, such as the receipt of an email, a text message, a news story, a stock price, a reminder, and/or a low power state of a power source in the electronic device.

The electronic device can be any type of electronic device, including, but not limited to, a digital music player, a computing device, and a wearable device. As one example, the electronic device may be configured in the form of a wearable health assistant that provides health-related information (whether real-time or not) to the user, authorized third parties, and/or an associated monitoring device. The device may be configured to provide health-related information or data such as, but not limited to, heart rate data, blood pressure data, temperature data, oxygen level data, diet/nutrition information, medical reminders, health-related tips or information, or other health-related data. The associated monitoring device may be, for example, a tablet computing device, phone, personal digital assistant, computer, and so on.

As another example, the electronic device can be configured in the form of a wearable communications device. The wearable communications device may include a processor coupled with or in communication with a memory, one or more communication interfaces, output devices such as displays and speakers, and one or more input devices. The communication interface(s) can provide electronic communications between the communications device and any external communication network, device or platform, such as but not limited to wireless interfaces, Bluetooth interfaces, USB interfaces, Wi-Fi interfaces, TCP/IP interfaces, network communications interfaces, or any conventional communication interfaces. The wearable communications device may provide information regarding time, health, statuses or externally connected or communicating devices and/or software executing on such devices, messages, video, operating commands, and so forth (and may receive any of the foregoing from an external device), in addition to communications.

Referring now to FIG. 1, there is shown an illustrative block diagram of an electronic device that can be in communication with one or more haptic devices in an attachment mechanism of a band. In the illustrated embodiment, the attachment mechanism attaches the band to the electronic device. In another embodiment, the attachment mechanism can attach the band to the wearer. For example, a buckle may be used to attach a wrist band to a wearer, and a haptic device or devices can be included in the buckle. And in yet another embodiment, an attachment mechanism or mechanisms can attach the band to the wearer and another attachment mechanism(s) may attach an electronic device to the band.

The electronic device 100 can include a processing device 102, a network communication interface 104, a display 106, a memory 108, one or more sensors 110, and a power source 112. The processing device 102 can control some or all of the operations of the electronic device 100. The processing device 102 can communicate, either directly or indirectly, with substantially all of the components of the electronic device 100. For example, a system bus or signal line 114 or other communication mechanisms can provide communication between the processing device 102, the network communication interface 104, the display 106, the memory 108, the one or more sensors 110, and/or the power source 112. The processing device 102 can be implemented as any electronic device capable of processing, receiving, or transmitting data or instructions. For example, the processing device 102 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The network communication interface 104 can facilitate transmission of data to or from other electronic devices. For example, a network communication interface can transmit and receive electronic signals via a wireless and/or wired network connection. Examples of wireless and wired network connections include, but are not limited to, cellular, WiFi, Bluetooth, IR, Ethernet, and radio such as near field communication. In some embodiments, a processing device 116 external to the electronic device 100 can communicate with some or all of the components of the electronic device 100 through a wired or wireless network connection 118.

The display 106 may provide an image or video output for the electronic device 100. The display may also provide an input surface for one or more input devices, such as, for example, a touch sensing device and/or a fingerprint sensor. The display 106 may be substantially any size and may be positioned substantially anywhere on the electronic device 100. The display 106 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology.

The memory 108 can store electronic data that can be used by the electronic device 100. For example, a memory can store electrical data or content such as audio files, applications, user preferences, timing signals, video files and images, data structures or databases, documents, and device and application settings. The memory 108 can be configured as any type of memory. By way of example only, the memory can be implemented as random access memory, read-only memory, Flash memory, removable memory, or other types of storage elements, or combinations of such devices.

The electronic device 100 may also include one or more sensors 110 positioned substantially anywhere on the electronic device 100. The sensor(s) 110 may be configured to sense substantially any type of characteristic, such as but not limited to, images, pressure, light, touch, heat, movement, relative motion, biometric data, and so on. For example, a sensor 110 may be an image sensor, a heat sensor, a light or optical sensor, an accelerometer, a pressure transducer, a gyroscope, a magnet, a biometric sensor, and so on.

The power source 112 can be implemented with any device capable of providing energy to the electronic device 100. For example, the power source 112 can be one or more batteries or rechargeable batteries, or a connection cable that connects the remote control device to another power source such as a wall outlet.

The processing device 102 and/or an external processing device 116 can be in communication with and operatively connected to one or more haptic devices 120 that are included in the attachment mechanism 122. As described earlier, the illustrated attachment mechanism 122 attaches the electronic device to a band 124. Each haptic device 120 can produce a selected force (e.g., pressure), motion, and/or vibratory response in the attachment mechanism 122 to provide tactile stimulation to the skin of the person wearing the band 124. The one or more haptic devices 120 can be implemented with any suitable haptic technology, including, but not limited to, electromagnetic technology, piezoelectric technology, and/or electro-reactive polymers. Additionally or alternatively, a haptic device 120 can be configured as any type of motor that imparts or produces motion or action.

The processing device 102 and/or the external processing device 116 can transmit activation signals to one or more selected haptic devices 120 through a wired and/or wireless network connection (e.g., signal bus 114). Based on the received signal(s), each haptic device 120 produces a tactile vibration in, under and around the haptic device 120.

In some embodiments, the processing device 102 can include a waveform generator 126 configured to dynamically produce waveforms appropriate to activate selected haptic devices 120 to produce tactile vibrations. In some embodiments, the processing device 102 can access the memory 108 to retrieve waveform data that is received by the waveform generator 126. The waveform generator 126 can produce an appropriate waveform for one or more of the haptic devices 120. As will be described in more detail later, an appropriate waveform can be determined by one or more haptic characteristics, such as frequency, timing, direction, and/or duration.

It should be noted that FIG. 1 is illustrative only. In other examples, an electronic device 100 may include fewer or more components than those shown in FIG. 1. For example, an electronic device 100 can include one or more input/output (I/O) devices that can receive data from a user or one or more other electronic devices. One example of an I/O device is a button, such as a home button, a button to increase or decrease volume, and/or an on/off button. An I/O device can include a touch sensing input surface such as a trackpad, one or more buttons, one or more microphones or speakers, one or more ports such as a microphone port, and/or a keyboard.

In some embodiments, the components shown in the electronic device 100 can be omitted from the electronic device 100 but included in the band 124. Additionally or alternatively, one or more components in the electronic device 100 can be duplicated in the band 124. For example, a processing device can be included in the band and connected to the network communication interface 104 and the haptic device(s) 120.

Figure 2:
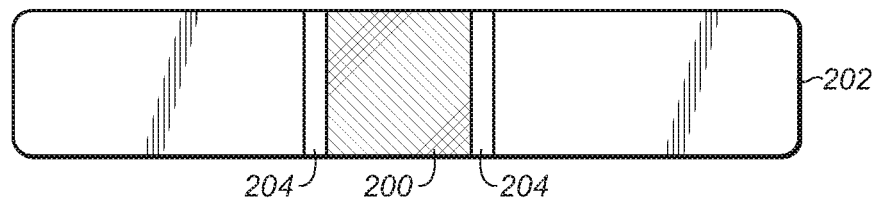
FIG. 2 is a top view of one example of an electronic device connected to a band.

FIG. 2 is a top view of an electronic device connected to a band. The electronic device 200 can be connected to the band 202 using one or more attachment mechanisms 204. The attachment mechanisms 204 can be attached to the band 202, the electronic device 200, and/or to both the band 202 and the electronic device 200. The band 202 and the attachment mechanism 204 can each be made of any suitable material. For example, the band 202 and/or attachment mechanism 204 can be made of plastic, metal, and ceramic. In some embodiments, the band 202 can be made of a leather or fabric.

Figure 3:
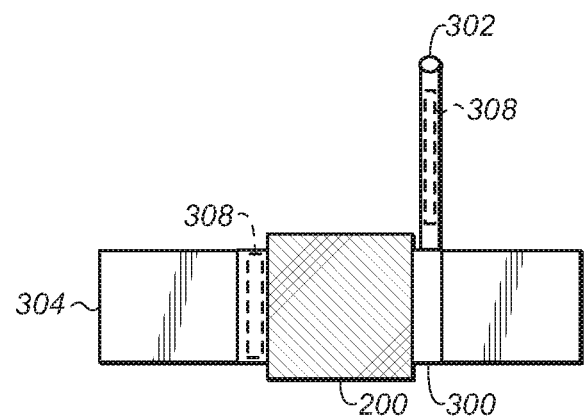
FIGS. 3 and 4 illustrate different examples of attachment mechanisms suitable for use as the attachment mechanisms shown in FIG. 2.
Figure 4:
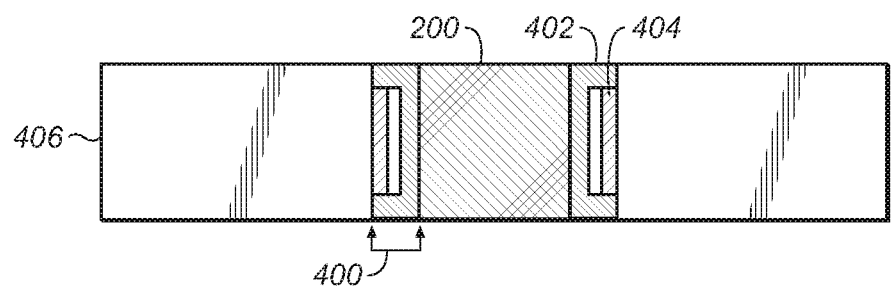

FIGS. 3 and 4 illustrate different examples of attachment mechanisms suitable for use as the attachment mechanisms 204 shown in FIG. 2. In FIG. 3, the attachment mechanism 300 includes a pin 302 that is used to attach the band 304 to the electronic device 200. As one example, a segment of the attachment mechanism 300 can be attached to the band 304 while another segment of the attachment mechanism 300 is attached to, or forms a part of, the electronic device 200. The pin 302 can be inserted into the two segments of the attachment mechanism 300 to attach the band 304 to the electronic device 200.

The pin 302 can be made of any suitable material, including, but not limited to, plastic, metal, and ceramic. One or more haptic devices 308 can be included in at least one pin 302 and/or in at least one pin 302 and a section of the band 304 and/or electronic device 200 that is adjacent to the pin 302. In one embodiment, one or more signal lines (not shown) can operatively connect each haptic device 308 to a processing device in the electronic device 200. One example of a haptic device 308 is described in more detail in conjunction with FIG. 6.

As described previously, the haptic device(s) 308 can produce a selected force (e.g., pressure), motion, and/or vibratory response that causes one or both attachment mechanisms 300 to move with respect to the electronic device 200, thereby providing tactile stimulation to the skin of the person wearing the band 304. In one embodiment, at least one pin 302 moves with respect to the electronic device 200. An activation signal can be sent at select times to a single haptic device 308 or to groups of two or more haptic devices 308. The activation signal can be sent by a processing device, such as the processing device 102 shown in FIG. 1. Haptic stimulation can act as notifications for one or more events, such as the receipt of an email, a text message, a news story, a stock price, a reminder, and/or a low power state of a power source in the electronic device 200.

FIG. 4 depicts another type of attachment mechanism. Each attachment mechanism 400 includes a bracket 402 and a pin 404. In one embodiment, the band 406 can be attached to the pins 404 and the brackets 402 can be attached to, or form a part of, the electronic device 200. The band 406 can attach to the electronic device 200 by attaching each pin 404 to a respective bracket 402.

The brackets 402 and the pins 404 can be made of any suitable material, including, but not limited to, plastic, metal, and ceramic. One or more haptic devices can be included in at least one pin 404 and/or in at least one pin 404 and a section of the band 406 and/or the bracket 402 that is adjacent to the pin 404. In one embodiment, one or more signal lines (not shown) can operatively connect each haptic device to a processing device in the electronic device 200. Like the FIG. 3 embodiment, the haptic device(s) can produce a selected force (e.g., pressure), motion, and/or vibratory response that causes at least one attachment mechanism 400 (e.g., pin 404) to move with respect to the electronic device 200, thereby providing tactile stimulation to the skin of the person wearing the band 406.

It should be noted that FIGS. 3 and 4 are illustrative only. In other embodiments, different types of attachment mechanisms can be used to attach a band to an electronic device.

Figure 5:
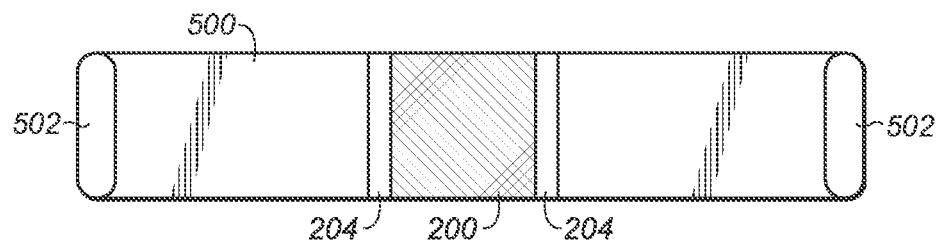
FIG. 5 is a top view of another example of an electronic device connected to a band.

FIG. 5 is a top view of another example of an electronic device connected to a band. The electronic device 200 can be connected to the band 500 using one or more attachment mechanisms 204. The attachment mechanisms 204 can be attached to the band 500, the electronic device 200, and/or to both the band 500 and the electronic device 200.

The attachment mechanisms 502 can be used to attach the band 500 to the wearer. As one example, the attachment mechanisms 502 can be configured as a clasp and join together to attach the band 500 around a wrist of a wearer. One or more haptic device(s) can be included in the attachment mechanisms 204 and/or in the attachment mechanisms 502. Each haptic device can produce a selected force (e.g., pressure), motion, and/or vibratory response that causes at least one attachment mechanism 204 and/or 502 to move with respect to the electronic device 200, thereby providing tactile stimulation to the skin of the person wearing the band 500.

The band 500 and the attachment mechanisms 204, 502 can each be made of any suitable material. For example, the band 500 and/or attachment mechanism(s) 204, 502 can be made of a, plastic, metal, and ceramic. In some embodiments, the band 500 can be made of a leather or fabric.

Figure 6:
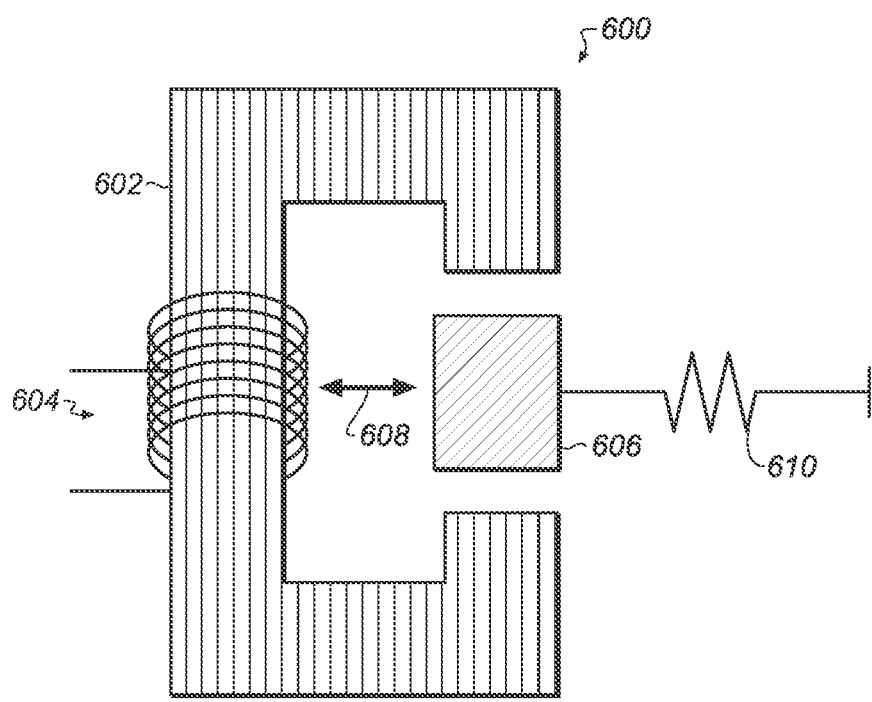
FIG. 6 is simplified view of one example of a haptic device that can be included in an attachment mechanism.

Referring now to FIG. 6, there is shown a top view of one example of a haptic device that can be included in an attachment mechanism. The illustrated haptic device is an electromagnetic actuator 600. A stator 602 is configured in a "C" shape and a coil 604 is wrapped around the stator 602. A movable armature 606 is positioned in the opening of the "C" shaped stator 602. The stator 602 and the movable armature 606 can be formed with any suitable ferromagnetic material.

A magnetic field is produced around the coil 604 when current flows through the coil 604. The magnetic field applies a force to the armature 606 to move the armature 606 in the direction of the magnetic field. In one embodiment, the armature 606 can move in the direction(s) shown by the arrow 608. Other embodiments can move the armature 606 in different directions, such as, for example, a lateral or sideways direction. In some embodiments, the movable armature 606 can be attached to a spring or some other element 610 that can limit the movement of the armature 606 and act as a restoring force for the armature 606.

A haptic device can be configured differently in other embodiments. A linear actuator, an electromagnetic actuator with a different design, a gear and pinion, and/or another type of motor can be used to produce a force and/or motion that causes an attachment mechanism to move relative to the band or electronic device.

Figure 7:
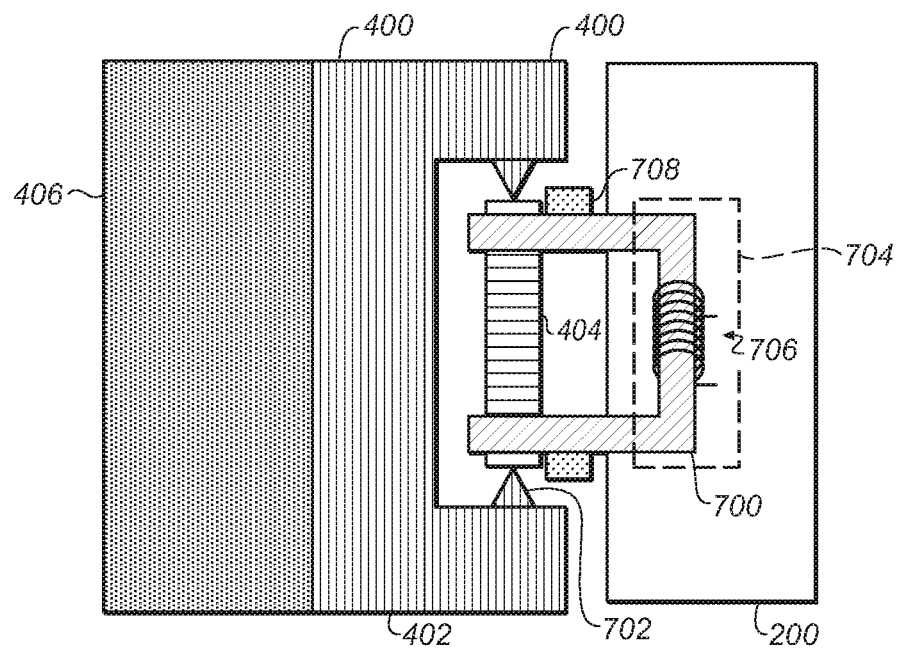
FIG. 7 is an enlarged view of the attachment mechanism shown in FIG. 4 with a haptic device.

FIG. 7 is an enlarged view of the attachment mechanism 400 shown in FIG. 4 that includes a haptic device. The bracket 402 is attached to the band 406. The pin 404 can be inserted through openings (not shown) in support 700 and held in place with holding elements 702. The support 700 can attach to a support structure 704 in the electronic device 200. The pin 404 acts as a movable armature and the support 700 as a stator in the illustrated embodiment. A wire or coil 706 can be wrapped around the support 700. When a current is applied to the coil 706, the pin 404 moves with respect to the electronic device 200. In some embodiments, bumpers 708 are positioned on the outside surface of the support 700 adjacent to the pin 404 to dampen the movement of the pin 404 and/or to act as a restoring element for the pin 404. In one embodiment, the bumpers 708 are made of an elastomeric material.

Figure 8:
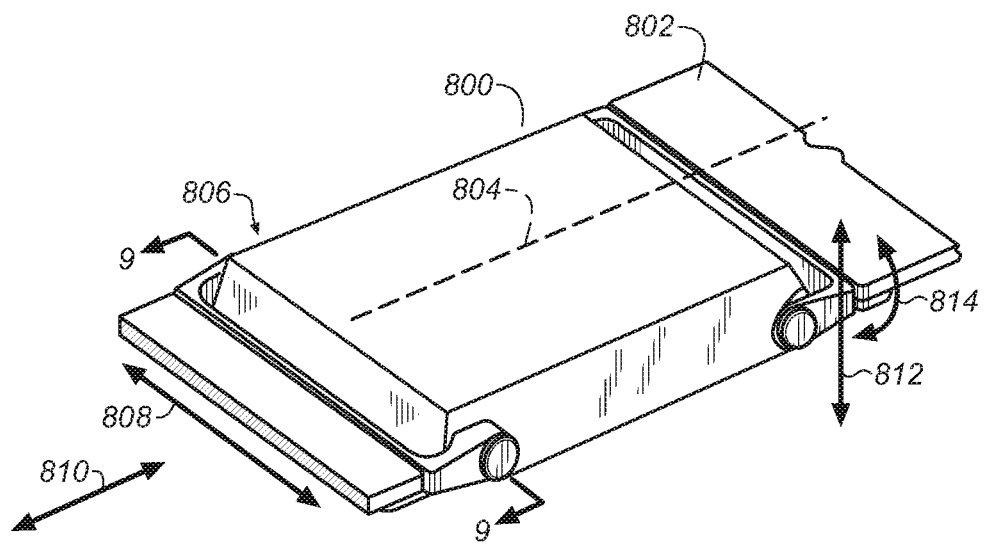
FIG. 8 a perspective view of an electronic device attached to a band and illustrates example movements of an attachment mechanism.

FIG. 8 is a perspective view of an electronic device attached to a band and illustrates example movements of an attachment mechanism. In the illustrated embodiment, the electronic device 800 and the band 802 are co-linear in that they lie along a line 804. The attachment mechanism 806 can move in one or more directions. For example, the attachment mechanism 806 can move laterally or horizontally perpendicular 808 to the line 804. The attachment mechanism 806 moves side-to-side with respect to the electronic device 800 and/or the band 802.

Additionally or alternatively, the attachment mechanism 806 can move in parallel with the line 804. Thus, the attachment mechanism 806 can move in-and-out with respect to the electronic device 800 and/or the band 802. In some embodiments, the attachment mechanism 806 can move vertically perpendicular 812 with the line 804. Thus, the attachment mechanism 806 can move up and down with respect to the electronic device 800 and/or the band 802. In other embodiments, the attachment mechanism 806 can rotate around the line 804. Thus, the attachment mechanism 806 can rotate with respect to the electronic device 800 and/or the band 802.

In other embodiments, the electronic device 800 and the band 802 are not co-linear. As one example, an electronic device 800 can attach to a band 802 perpendicularly or diagonally with respect to the band 802.

In some embodiments, an attachment mechanism 806 can produce one of the illustrated motions, some of the motions, or all of the motions. Additionally, an attachment mechanism 806 can produce another type of motion. For example, an attachment mechanism 806 can move in a combination of two or more directions (e.g., motions 810 and 812).

Figure 9:
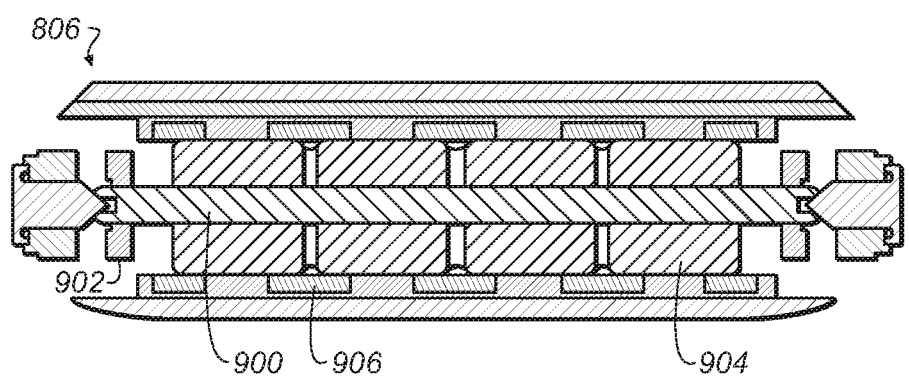
FIG. 9 is a cross-sectional view of the attachment mechanism taken along line 9-9 in FIG. 8.

Referring now to FIG. 9, there is shown a cross-sectional view of the attachment mechanism 806 taken along line 9-9 in FIG. 8. A pin 900 extends across the attachment mechanism 806 and attaches on each end to a support 902. A series of magnets 904 are wrapped around or adjacent to the pin 900. The magnets 904 can be attached to each other, such as with an adhesive material.

One or more wires or coils 906 can be wrapped around the magnets 904. The pin 900 moves when an electrical current is applied to the coil or coils 906. In the illustrated embodiment, the pin 900 moves laterally or side-to-side with respect to the magnets 904. In one embodiment, the attachment mechanism 806 can be attached to the band such that the pin 900, the magnets 904, and the coil(s) 906 are included in, or connected to the band.

Figure 10:
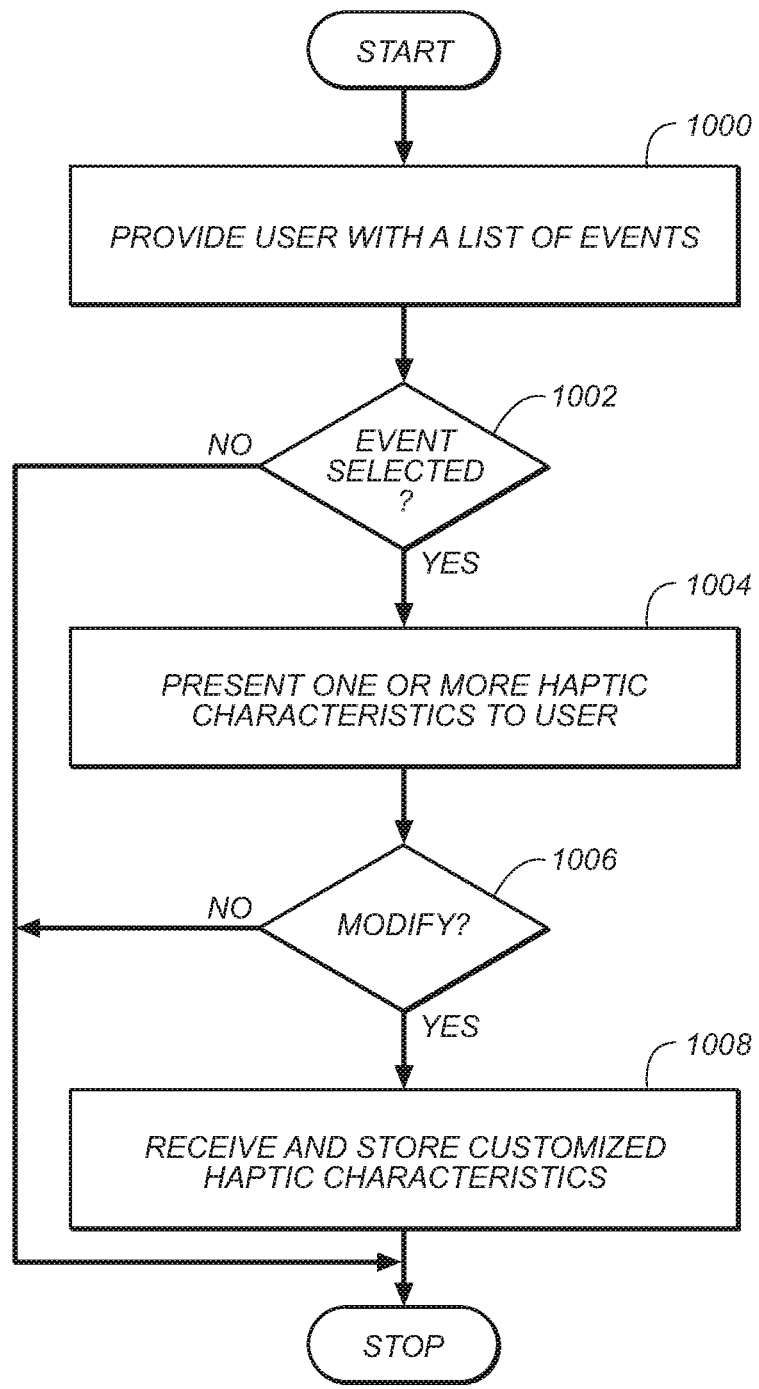
FIG. 10 is a flowchart of a method for associating a haptic response with an event.

Referring now to FIG. 10, there is shown a flowchart of a method for associating a haptic response with an event. Initially, a list of events can be presented to a user at block 1000. The list of events can include events that can be generated or received by an electronic device. The list of events can be associated with an application and/or a function running on, or connected to the electronic device. A wearer of the band can be notified of one or more events with a haptic response. For example, a haptic response can be produced when an email or text message is received, when a voicemail or call is received (when the electronic device is a mobile telephone), when the power source (e.g., 112 in FIG. 1) is in a low power state, when a navigation program provides turn-by-turn directions, and/or when an emergency alert is received. A haptic response can be used to notify a wearer of an upcoming meeting or activity scheduled in a calendar program. The notifications can be event based and/or location based. For example, a user can receive news alerts or notifications for particular events, such as sporting events. Similarly, the notifications can relate to one or more particular geographical locations, such as a city or neighborhood. Notifications can be associated with the weather, when a motion sensor is activated in the home, and/or when a car alarm is activated. These example events are illustrative only, and a haptic response can be used to notify a wearer of other types of events.

Next, as shown in block 1002, a determination is made as to whether an event has been selected by the user. If not, the method ends. When an event is selected, the process passes to block 1004 where one or more haptic characteristics can be presented to the user. Example haptic characteristics include, but are not limited to, whether to receive a haptic response or not, the number of haptic devices to be activated for haptic stimulation, the specific device or devices to be activated, the timing of the activation of the one or more haptic devices, a frequency or intensity of the haptic response, a direction or type of movement, and/or the duration of the haptic response. The one or more haptic characteristics can be presented as a list in a menu or through a set of radio buttons or dialog boxes. In some embodiments, the presentation of haptic characteristics can be organized by the type of haptic stimulation, such as by a force or by a movement. A user can customize the haptic response by specifying particular information for the one or more haptic characteristics. As one example, a user can specify movement in one direction at a given intensity for a particular time period.

In some embodiments, the haptic characteristic(s) associated with an event can be set at a default setting. For example, the default setting can be set to disable the haptic stimulation, or set to a given setting that produces a minimum level of haptic response. The method shown in FIG. 10 can allow the user to modify the default settings.

A determination is then made at block 1006 as to whether a user has modified one or more haptic characteristics for the selected event. If not, the method ends. When a user has modified one or more haptic characteristics, the method continues at block 1008 where the customized haptic characteristic(s) are received and stored in a memory (e.g., memory 108 in FIG. 1). The customized haptic characteristic(s) can then be used each time a notification is to be sent to a user.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An attachment mechanism that attaches a band to an electronic device, the attachment mechanism comprising:
   a pin attached to the band;
   a housing having supports adjacent each end of the pin and attached to the electronic device; and
   a haptic device that electromagnetically couples the pin to the housing and is adapted to move the pin at least side-to-side with respect to the housing in response to an activation signal.

2. The attachment mechanism as in claim 1, wherein the haptic device comprises one or more electromagnetic actuators that receive the activation signal.

3. The attachment mechanism as in claim 1, wherein the electronic device comprises one of a wearable communications device and a wearable health assistant.

4. An attachment mechanism attached to a band, the band configured to encircle a body part of a user, the attachment mechanism comprising a pin, a housing having supports adjacent each end of the pin, and a haptic device adapted to move the pin at least laterally with respect to the housing.

5. The attachment mechanism as in claim 4, wherein the haptic device comprises one or more electromagnetic actuators.

6. A system, comprising:
   a band;
   an attachment mechanism comprising a pin attached to the band;
   a processing device; and
   one or more haptic devices disposed in the attachment mechanism and in communication with the processing device, at least one haptic device comprising an electromagnetic actuator that comprises:
      one or more magnets positioned around the pin; and
      one or more coils positioned around the one or more magnets;
   wherein the electromagnetic actuator produces a haptic response based on an activation signal received from the processing device, the haptic response moving the pin at least laterally with respect to the magnets when the band is attached to an electronic device by the attachment mechanism.

7. The system as in claim 6, wherein the processing device is included in the electronic device.

8. The system as in claim 7, wherein the electronic device comprises one of a wearable communications device and a wearable health assistant.

9. The system as in claim 7, wherein the attachment mechanism moves laterally with respect to the electronic device.

10. The system as in claim 7, wherein the electronic device comprises a computing device.

11. The system as in claim 6, wherein the attachment mechanism moves laterally with respect to the band.

12. The system as in claim 6, wherein the electromagnetic actuator produces a haptic response by moving the pin laterally with respect to the band.

13. A method for providing a haptic output from an electronic device, comprising:
   receiving an indication that the haptic output is to be generated; and
   in response to receiving the indication, providing an activation signal to an electromagnetic actuator that moves a pin at least laterally with respect to a support of the electromagnetic actuator, wherein the support is coupled to a body of the electronic device, the pin is coupled to a flexible portion of the electronic device, and the support and the pin form an attachment mechanism coupling the body of the electronic device to the flexible portion of the electronic device; wherein,
   the flexible portion is configured to encircle a body part of a user.

14. The method of claim 13, wherein the flexible portion is configured to slide along the body part of the user.

15. The method of claim 13, wherein the pin is received in one or more openings in the support.

16. The method of claim 15, wherein:
   a coil is wrapped around the support; and
   the activation signal;
      applies a current to the coil; and
      moves the pin relative to the body of the electronic device.

* * * * *